Aug. 5, 1969   W. C. DODSON, JR., ET AL   3,458,905
APPARATUS FOR ENTANGLING FIBERS
Original Filed July 5, 1966   7 Sheets-Sheet 1

INVENTORS
WILLIAM C. DODSON, JR.
GEORGE R. LONG

BY  *Norris E. Ruckman*

ATTORNEY

INVENTORS
WILLIAM C. DODSON, JR.
GEORGE R. LONG

BY
ATTORNEY

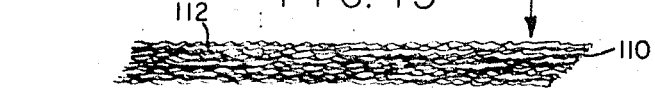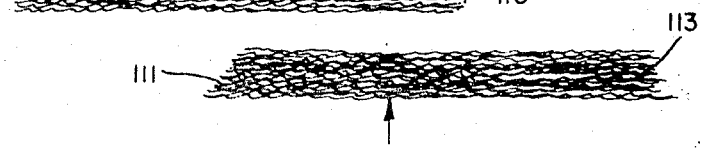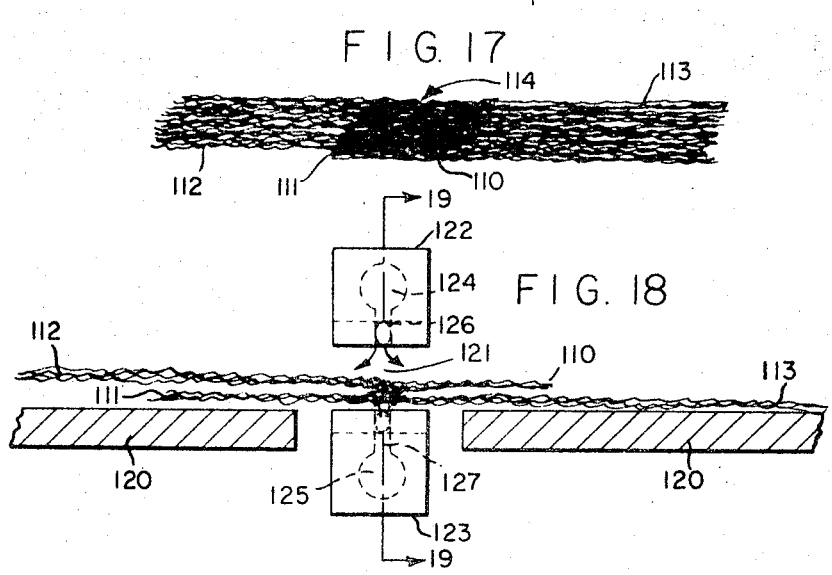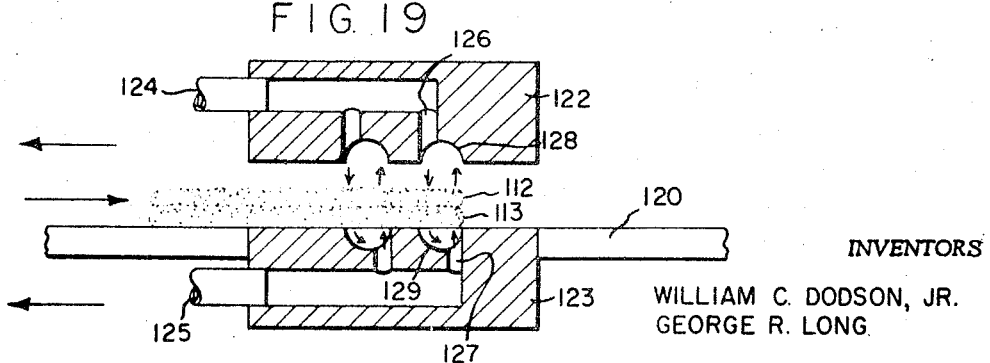

INVENTORS
WILLIAM C. DODSON, JR.
GEORGE R. LONG

BY *Norris E. Rushman*

ATTORNEY

United States Patent Office 3,458,905
Patented Aug. 5, 1969

3,458,905
APPARATUS FOR ENTANGLING FIBERS
William C. Dodson, Jr., Wilmington, and George R. Long, Newark, Del., assignors to E. I. du Pont de Nemours and Company, Wilmington, Del., a corporation of Delaware
Application July 5, 1966, Ser. No. 564,499, now Patent No. 3,339,362, dated Sept. 5, 1967, which is a division of application Ser. No. 563,934, July 5, 1966, now Patent No. 3,353,225, dated Nov. 21, 1967. Divided and this application Aug. 3, 1967, Ser. No. 658,224
Int. Cl. D04h 11/00
U.S. Cl. 19—161
16 Claims

ABSTRACT OF THE DISCLOSURE

Apparatus is disclosed for entangling fibers in an assembly of fibers to produce patterned nonwoven fabric or to unite layers, including splicing of tows. High velocity streams are jetted from orifices of jet devices having opposed face portions which are spaced to provide a treatment zone and are grooved to guide the outflow of jetted fluid along bilateral paths. The assembly of fibers is moved between the jet devices in a direction transverse to the grooves to entangle fibres within the streams.

The apparatus is preferred for the processes claimed in our applications Ser. No. 564,499 filed July 5, 1966, now U.S. Patent No. 3,339,362 and Ser. No. 563,934 filed July 5, 1966, now U.S. Patent No. 3,353,225, from which the present invention was divided in accordance with restriction requirements.

CROSS-REFERENCES TO RELATED APPLICATIONS

This is a division of the following applications: Ser. No. 564,499 filed July 5, 1966, now U.S. Patent No. 3,339,362, as a continuation-in-part of No. 490,387 filed Sept. 27, 1965 (now abandoned), and No. 563,934 filed July 5, 1966, now U.S. Patent No. 3,353,225, as a continuation-in-part of No. 482,128 filed Aug. 24, 1965 (now abandoned).

This invention is concerned with imparting coherence to a sheet of fibers. More particularly, it relates to apparatus for directing opposed fluid jets against a sheet of fibers to entangle the fibers thereof.

The present invention provides apparatus for preparing patterned coherent nonwoven structures directly from loose fibrous layers by treatment with opposed high velocity streams of fluid, without the need of binders or adhesives and without having to use a patterning plate or supporting member during processing.

In addition the present invention provides apparatus for uniting layers of sheet material into a coherent structure. In particular, it provides for joining the overlapped ends of filamentary strands, such as tows, yarns or threads, quickly and simply, thereby minimizing the labor required, avoiding the interruption of continuous processing, and eliminating the waste of material, such as had resulted from the necessity to discard the knotted or cemented sections of tow joined by prior art knotting or bonding techniques. The spliced area of tows joined by this invention is strong and flexible, and is not lumpy, whereby it can pass through conventional tow processing machinery. The invention is also useful for imparting coherence to multifilament strands or for joining adjacent multifilament strands at intervals along their lengths.

The apparatus has a pair of spaced orifice plates, the opposed faces of which are generally parallel to define a treating zone open at the sides for passage of the material to be treated. Orifices are provided in the plates for directing high velocity streams of fluid into the treating zone, the orifices being aligned in a common plane to form opposed streams. Face grooves direct the fluid outflow along transverse paths from the treating zone.

The apparatus is useful for treating a sheet of loose fibers to impart a pattern and coherence simultaneously to the sheet. Briefly, the process involves subjecting the sheet to opposed high velocity streams of fluid under flow conditions which simultaneously effect an interlooping and parallelizing action on the fibers in the path of the streams. In general, this is achieved by passing the sheet between a pair of jet devices by moving the sheet and/or the jet devices, each jet device having (1) an internal fluid supply plenum, (2) a series of small holes, aligned in the direction of movement of the sheet and perpendicular to the face of the jet device, for discharging coaligned fluid streams from the face of the jet device against the sheet and (3) exit face grooves arranged to direct outflow of the fluid along transverse paths against the sheet. The resulting products have a patterned row, corresponding to the path of the fluid streams, comprising generally parallel fibers which are twisted or looped over one another and are compacted with respect to one another, particularly along the edges of the row.

The term "sheet" as used herein includes any assembly of loose fibers, arranged haphazardly, or in alignment, as in a card web or in a tow. The fibers should be loosely arranged in the initial sheet, i.e., they should be free to move about in response to the forces created by the fluid streams. When the process is used for treating or splicing yarns or tows, especially if large tows are being joined, the splicing is more effective if each filamentary bundle is spread out in the form of a flat sheet as a band or ribbon.

The term "fiber" includes both natural and synthetic staple fibers and continuous filaments, either straight or crimped, of types commonly employed in textile uses, including blends thereof.

In operation, the initial sheet of fibers is preferably passed between a pair of identical jet devices which are positioned facing each other with just sufficient clearance for the sheet to pass therebetween. A preferred jet device has grooves in the face adjacent the sheet with a single fluid exit-hole or orifice drilled perpendicular to the face of the jet device in each groove. The sheet is moved between the jet devices in a direction transverse to the grooves so that it is subjected to opposed fluid streams emerging from the holes in successive grooves. The streams exiting from the holes in the top jet device exert a downward force component on the fibers at the top surface of the sheet and a similar opposed force component is exerted upwardly at the bottom surface of the sheet by the streams exiting from the bottom jet device. Motion of the sheet relative to the fluid streams creates a dragging force component on the fibers as they move from stream to stream. Additional force components are exerted against the fibers in a horizontal direction, i.e., in the plane of the sheet as a result of the bidirectional outflow of the fluid along the grooves of the jet device. The horizontal bidirectional forces move fibers parallel to one another and parallel to the grooves, and perpendicular to the path of the travel of the fluid streams. At the same time, the vertical forces from above and below the sheet coupled with the dragging forces cause individual fibers and/or small groups of fibers to loop or twist about one another. As the opposed fluid streams traverse the sheet, they create a patterned row of interlooped and generally parallel fibers along their path of travel. The interlooping is particularly visible along lateral edges of the row where a compaction of the sheet is also observed. This compaction is believed to be due to the horizontal bidirectional components of force acting on the sheet of fibers to cause fiber crossings, i.e., sites where two or more fibers cross one another in the initial sheet, to move laterally to the edges of the path followed by the fluid streams.

The process of splicing filamentary strands is similar. The filaments of a plurality of strands are supported in overlapping, generally parallel relationship, between the opposed streams in a plane which is nominally perpendicular to the plane of the axes of the fluid orifices, and are entangled during relative motion between the strands and the fluid streams in a direction substantially parallel to the common plane of the fluid streams. The process may be more effectively operated by directing a compressible fluid at high velocity through a conduit essentially perpendicular to the plane of strand travel and directed against an inclined wall on the opposite side of the plane. The filaments or groups of filaments are randomly spread apart, oscillated, twisted and intermingled with adjacent filaments or filament groups by the interplay of the plural fluid streams.

Various modifications in the flow pattern can be provided in the apparatus without departing from the basic concepts of the present invention, to produce special effects. These involve the positioning of the fluid exit holes within the groove of the jet device and the alignment of the pair of jet devices with respect to one another, as will be explained in detail in the discussion accompanying the following figures.

BRIEF DESCRIPTION OF THE DRAWINGS

FIGURE 15 and FIGURE 16 are schematic illustrations of two filamentary bundles in overlapping positions prior to making an end joint according to this invention;

FIGURE 17 is a schematic illustration of a joint made according to the invention;

FIGURE 18 is a side elevation of one form of apparatus which also schematically illustrates treatment of the filamentary bundles within the apparatus while making the joint of FIGURE 17;

FIGURE 19 is a sectional view taken on line 19—19 of FIGURE 18;

In the embodiment of this invention illustrated in FIGURE 1, the initial sheet 10 is passed in the direction indicated by arrow 11 between a pair of opposed jet devices 12 and 12a. The devices have fluid supply passages 13 and 13a, faces having a number of grooves 14 and 14a, and fluid exit-holes or orifices 15 and 15a drilled in the grooves, one hole per groove. The jet devices should be aligned so that the opposed faces are generally parallel, the orifices are aligned in a common plane to form opposed pairs of streams, and the grooves are parallel to each other and perpendicular to the common orifice plane. Optimum alignment for producing the best patterning can be effected by approximately aligning the jet devices visually and then, while supplying steam to the devices, adjusting their positions relative to one another until a horizontal bilateral outflow of steam of uniform intensity is observed exiting from the grooves. The bilateral horizontal outflow of fluid is shown at 20 in FIGURE 2. In FIGURE 3, the bilateral outflow 30 exiting from the 4 grooves is shown. As the sheet passes between the jet devices in the direction 11 (FIGURE 1), vertical forces exerted by the fluid streams from holes 15 and 15a coupled with forces created by the motion of the sheet cause fibers to move from one surface of the sheet toward the other and to become looped about one another in so doing. The bilateral horizontal forces from the outflow of fluid along the grooves 14 and 14a are at the same time aligning the fibers parallel to the grooves and perpendicular to the direction in which the sheet is moving. Fiber crossings present in the area of the initial sheet being treated are pushed aside by the bilateral horizontal forces and compacted with other fibers at the edge of the treatment area, i.e., at the end of the grooves.

Although FIGURE 1 shows an embodiment in which the exit holes 15 and 15a are drilled perpendicular to the face of the jet device along the center line of the grooves 14 and 14a, it has been found that off-center hole locations are generally preferable. In the embodiments shown in FIGURES 4 and 5, the fluid exit-holes are drilled perpendicular to the face of the jet device but to one side of the center line of the groove, and the jet devices are arranged so that the fluid exit-holes of the top and bottom devices are on opposite sides of the center lines of the grooves.

Referring to FIGURE 4, fluid is introduced under pressure into passages 40 and 40a and exits from holes 41 and 41a drilled in grooves 42 and 42a of jet devices 43 and 43a. With the jet devices in the position shown in FIGURE 4, it can be seen that each of the holes 41 is to the right of the center line in grooves 42, whereas holes 41a are to the left of the center lines of grooves 42a. The jet devices are first approximately aligned in the position illustrated and are then adjusted to provide optimum alignment by observation of the outflow of steam as described in connection with FIGURES 2 and 3. When the proper bilateral horizontal outflow is effected, the sheet to be treated is passed between the jet devices either from the direction indicated by arrow 44 or from the reverse direction. The arrangement of the jet devices is such that the sheet is subjected to successive pairs of fluid streams which are opposed but slightly off-set with respect to one another in the direction of travel of the sheet. Fluid exiting from holes 41 tends to flow in the direction indicated by arrow 45, while fluid from hole 41a follows the direction 45a, and it is believed that a torque-like flow pattern is thereby generated within the area defined by opposed grooves of the jet devices. Products obtained by treating sheets with this embodiment, in contrast with the embodiment of FIGURE 1, are characterized by a more distinct pattern definition and a greater twisting and interlooping of fibers about one another to form tightly entangled groups along the path of treatment.

Figure 4:
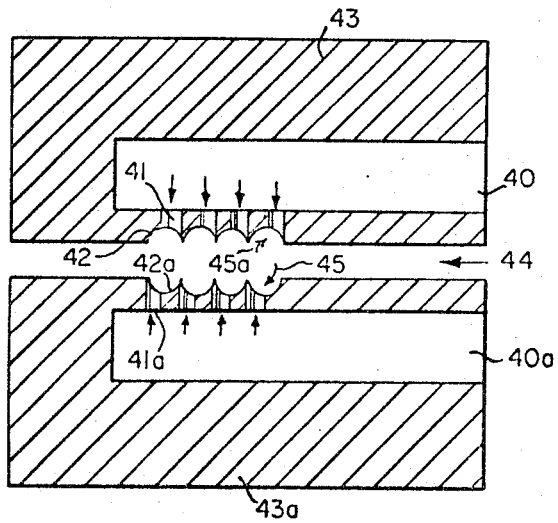
FIGURES 4, 5 and 6 are sectional side views of other embodiments of jet devices of the present invention, the sections being taken as in FIGURE 1.
Figure 5:
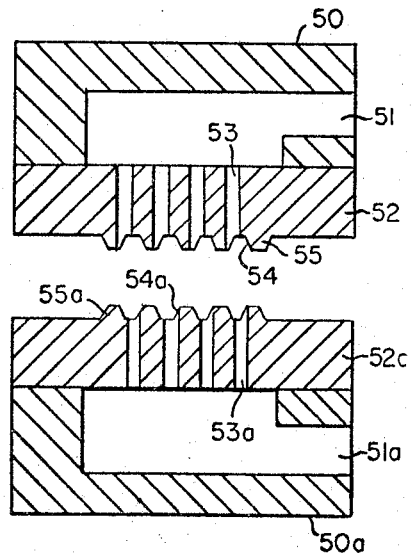

Another preferred apparatus is shown in FIGURE 5 and operates in the same manner as the apparatus of FIGURE 4 to create a torque-like flow pattern. The jet devices comprise body members 50 and 50a with fluid passages 51 and 51a and orifice plates 52 and 52a. The orifice plates are fabricated from sections of gear rack by drilling fluid exit-holes 53 and 53a to intercept the faces 54 and 54a of teeth 55 and 55a.

Figure 3:
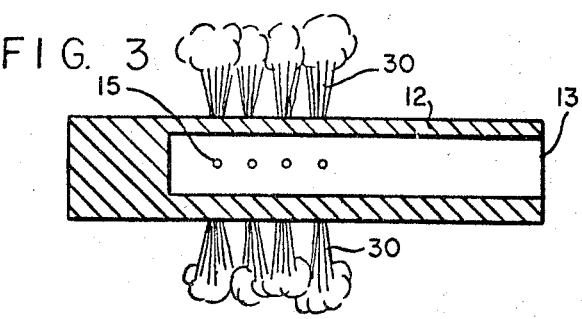
FIGURE 3 is a sectional view taken along line 3—3 of FIGURE 1.
Figure 6:
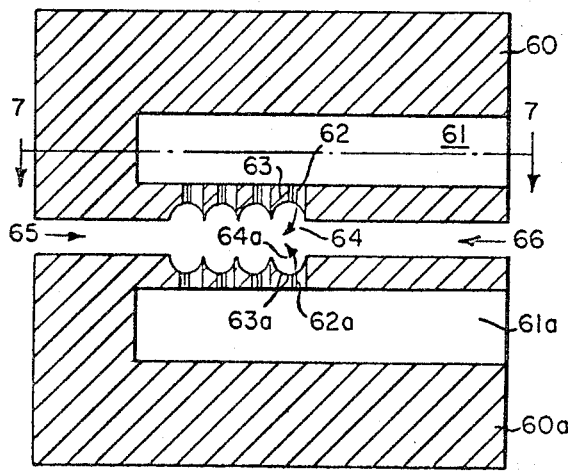
Figure 7:
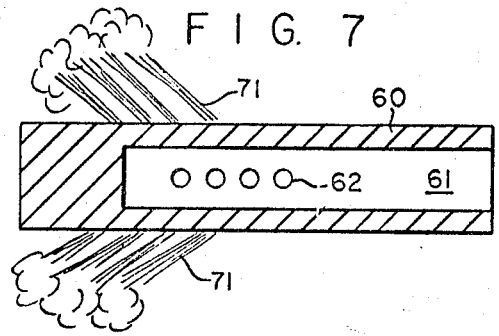
FIGURE 7 is a sectional view taken along lines 7—7 of FIGURE 6.
Figure 9:
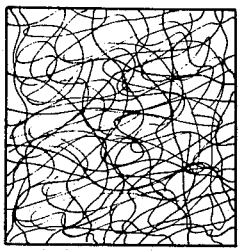
FIGURE 9 is a schematic top view illustrating a sheet of random fibers for use as initial material in the preparation of products of the present invention.

In FIGURE 6 is shown still another embodiment of opposed jet devices which is useful when using gaseous fluid for creating a knit-stitch type of interlooping of fibers along the path of treatment. Opposed jet devices 60 and 60a are provided with gas supply passages 61 and 61a. Gas exit-holes 62 and 62a are drilled perpendicular to the face of the jet device and to one side of the center line of the grooves 63 and 63a. The jet devices are positioned so that the gas exit-holes of the mated top and bottom grooves are approximately opposite each other. With the jet devices arranged in this way, gas exiting from hole 62 tends to flow in the direction indicated by arrow 64 and gas exiting from hole 62a follows the path indicated at 64a. Outflow of gas, as observed with steam, is as shown in FIGURE 7 when the jet devices are properly aligned. In the previous embodiments discussed in connection with FIGURE 3, the bilateral horizontal outflow of gas is generally parallel to the grooves. When the jet devices are arranged as in FIGURE 6, the bilateral horizontal outflow of gas is swept back at an angle to the grooves as indicated at 71 in FIGURE 7, corresponding to the flow direction indicated at 64 and 64a in FIGURE 6. With the jet devices properly aligned to produce the outflow pattern of FIGURE 7, different effects are obtained depending on the direction of passage of the sheet through the jet devices. When the sheet is passed in the direction indicated by arrow 65 in FIGURE 6, i.e., opposed to the direction of gas outflow, fibers tend to be successively looped over one another to form an entanglement resembling the interlooping of conventional knitting. This type of interlooping will be designated a knit-stitch; it is shown schematically in FIGURE 10a. When the sheet is passed between the jet devices in the direction indicated by arrow 66, the products are of the general type discussed in connection with FIGURES 1 to 5 and depicted in FIGURE 10.

Figure 8:
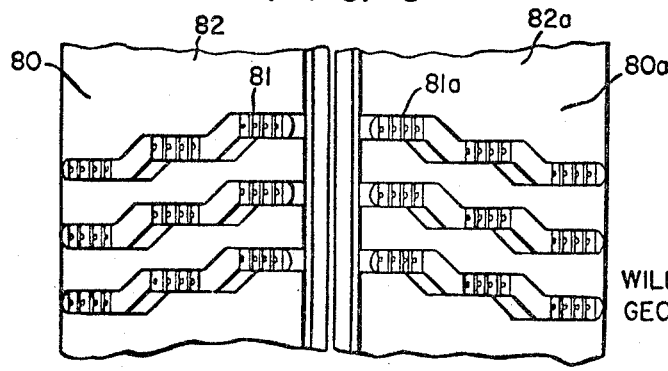
FIGURE 8 is a face view of apparatus in which a plurality of jet devices are combined for treating a sheet to impart a number of patterned rows simultaneously.

For the production of nonwoven fabrics, patterned rows are preferably inserted at closely-spaced regular intervals across the sheet. This can be done by successively inserting each patterned row by using one pair of opposed jet devices and moving them across the sheet at the desired spacing. Alternatively, a plurality of pairs of opposed jet devices can be combined in one apparatus to insert a number of patterned rows in the sheet simultaneously. Such an arrangement is shown in FIGURE 8 wherein 80 and 80a are the top and bottom jet devices shown in face view. In operation, the jet devices would be aligned as described in connection with FIGURES 1–7. In the grouping of jet devices as shown in FIGURE 8, the grooved faces 81 and 81a should be spaced from the bases 82 and 82a and from each other to provide exhaust space for the fluid exiting from the grooves. In the arrangement shown in FIGURE 8, there are nine pairs of grooved faces 81 and 81a permitting the simultaneous production of nine patterned rows across the sheet. Each face 81 and 81a has four grooves, each having a hole drilled in it perpendicular to the face and to one side of the center line of the groove. The grouping is such that the jet devices can be aligned opposite one another as described in connection with either FIGURE 4 or FIGURE 6. Groove length is 0.125 inch and the lateral separation between grooved faces is twice the groove length, which is the preferred minimum separation. The grooved faces 81 and 81a are spaced 0.5 inch from the bases 82 and 82a which provides adequate space for fluid to be exhausted from the device.

Suitable jet devices of the types shown in FIGURES 1, 4, 6 and 8 have the following dimensions:

Groove diameter (inches) _____ 0.031 to 0.125
Groove length (inches) _____ 0.125 to 0.5
Center-to-center distance
  between grooves (inches) _____ 0.031 to 0.125
Gas exit-hole diameter (inches) _____ 0.016 to 0.05
Length/diameter ratio of gas exit holes _____ 4/1
Hole arrangement (Perpendicular to face
  counterbored to provide conical inlet).

Gear racks having the following dimensions are suitable for making jet devices of the type shown in FIGURE 5.

Gear teeth (no./inch) _____ 20.4 to 10.2
Center-to-center distance between teeth
  (in.) _____ 0.049 to 0.098
Gear-tooth depth (in.) _____ 0.04 to 0.07
Groove length (in.) _____ 0.125 to 0.5
Gas exit-hole diameter (in.) _____ 0.016 to 0.05
Gear tooth angle _____ 14.5° to 20°

When using jet devices with the above dimensions for preparing strong, coherent patterned nonwoven fabrics, it has been found that each jet device should have at least two grooves with corresponding gas exit-holes, and optimum results are obtained with four. Preferably, the gas exit-hole diameter does not exceed one-half the groove diameter. With such jet devices, initial sheets of continuous filaments and/or staple fibers, weighing up to 3.5 oz./yd.², are patterned effectively with 40 to 95 p.s.i.g. air. In general, increasing the gas pressure gives better pattern definition. Heating the gas also improves processability of sheets having fibers which are rendered more pliable by the heat and hence are more responsive to the action of the gas blasts. Steam has been found to be a highly effective treating medium and has been used to pattern initial sheets weighing up to 10.5 oz./yd.².

The fluid used should, of course, be selected according to the nature of the fibers in the sheet to be patterned and the effect desired. Suitable gases include wet steam, saturated steam, superheated steam, unheated compressed air, heated compressed air and other gases, e.g., nitrogen directly from a cylinder. Liquids, preferably water, may also be substituted for gases in the jet devices of the dimensions described above. When liquids are used, fluid exit holes and grooves of smaller dimensions may be used and permit preparation of more closely spaced patterned rows.

Any of the heretofore described jet devices can be used for preparing nonwoven fabrics or for imparting coherence to or splicing multifilament strands.

With these devices, multifilament strands of continuous filament or long staple fibers in the form of yarns or tows can be readily fastened together. The strands may be twisted or may have zero bundle twist. The filaments may be natural or synthetic, either in a compact form or in a relatively loose bulky state, and with or without crimp. Usually only two strands are spliced together at a joint but a greater number can be combined if so desired. The filaments of the bundle are preferably in a generally parallel alignment but this is not a requirement; webs or mats of randomly-arranged filaments may be joined by this novel method.

To make the desired splice, the end portions 110 and 111 of the filamentary bundles to be connected are overlapped, either with the ends aligned in the same direction in juxtaposition as in FIGURE 15 where filament bundle 112 is shown above filament bundle 113, or with the filament bundles 112 and 113 extending in opposite directions as shown in FIGURE 16. It is preferred that large bundles of filaments be spread out in ribbon-like form, to facilitate penetration of the treating fluid through the filamentary structure and to obtain a greater degree of interentanglement between the filaments in the ends to be joined. After being placed in the desired relationship, the loose assembly of filaments, in essentially tensionless condition, is held in position on both sides of the zone to be joined and is then passed through the fluid treatment zone. The filamentary assembly may be held by hand or by a suitable clamp for temporary support under little or no tension during the splicing process.

FIGURE 18 is a schematic illustration of an assembly of overlapping filaments undergoing the joining process in one form of apparatus. The overlapped region of filamentary bundles 112 and 113 is supported on platen 120 which is aligned with the fluid treating zone 121 between the spaced halves 122 and 123 of a plural jet apparatus. A gaseous treating fluid, such as air, is supplied under pressure through passages 124 and 125 and, in turn, is directed through orifices 126 and 127 into the treating zone 121 to impinge upon the filaments of bundles 112 and 113 so as to set up a turbulent action, causing them to separate, oscillate and become interentangled either singly or in groups.

FIGURE 19 shows a corresponding transverse sectional view of the process and apparatus taken along line 19—19 of FIGURE 18. The overlapping assembly of filamentary bundles 112 and 113 is moved relative to the fluid treating apparatus comprised of spaced halves 122 and 123. The treating apparatus may be fixed while the filamentary material is moved across the platen 120 through the treatment passage, much as fabric is fed through a sewing machine and seamed. If desired, the material to be joined can be held in a fixed position while the treating device is moved across its width.

One effective treating apparatus employs fluid orifices 126 and 127 which are aligned, in the direction of fiber treatment, in a common plane essentially perpendicular to the treatment zone and which, when supplied with gaseous fluid under pressure will produce high velocity streams of gaseous fluid arranged in pairs so that each stream of a pair flows closely adjacent to, and in an opposed direction to, the other stream. In the path of each jet stream is a groove having an inclined surface, such as 128 or 129, which will divert the jet stream so that it will merge and flow with the adjacent jet stream flowing in the opposed direction. This provides a turbulent fluid action which is believed to be most effective to produce the desired entangling action on the filaments. In FIGURE 19, for example, fluid flows from orifice 126 downward through the filaments, strikes inclined wall 129 and is diverted toward the mouth of orifice 127 where it joins the jet stream flowing upward through the filaments. The upwardly directed stream strikes inclined wall 128 and is directed toward the mouth of orifice 126 where the flow pattern continues around the circuit. The grooves contribute to the efficiency of the apparatus by providing escape passages for the treating fluid, directing the fluid in a plurality of paths generally lengthwise of the fibers and parallel to the plane of the fiber strand thus enabling the fluid to exert additional forces on the fibers and enhance the entangling action. The escaping fluid flows along the grooves sidewise out of the treating apparatus, subjecting the filaments to an aligning force which facilitates the interentanglement. Surprisingly, the intense interentanglement of filaments and twisting of groups of filaments occurs within the treating zone defined by the apparatus and there is relatively little disturbance of the filament bundles outside this zone. The process may be repeated as often as desired in the overlapped region to provide a stronger joint.

Figure 20:
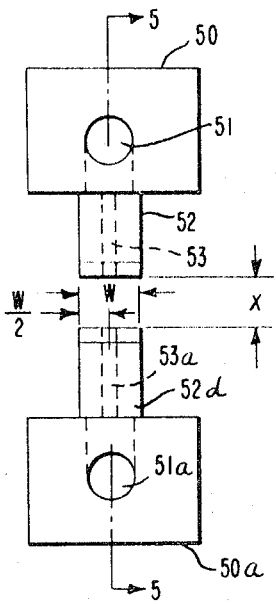
FIGURE 20 is a side elevation of the apparatus shown in FIGURE 5.

A particularly effective form of jet apparatus for splicing tow is illustrated in FIGURES 5 and 20. The upper half comprises a body 50 with fluid passage 51 and an orifice plate 52. In this embodiment orifice plates are fabricated from sections of gear rack. Fluid ducts have axes perpendicular to plate 52 and off-center in the grooves formed by teeth 55. The opposing half comprises body 50a with fluid passage 51a and orifice plate 52a and is similarly fabricated by providing fluid ducts 53a off-center in the grooves formed by teeth 55a. The two halves are so aligned that the axis of each fluid conduit intersects the face of a tooth in the other half so that an inclined wall is presented to the fluid stream issuing from the fluid conduit, as illustrated by the position of faces 54a opposite the conduits 53 and faces 54 opposite conduits 53a. The two halves are separated by distance X, sufficient for free movement of the filamentary material to be joined. In a typical assembly, each orifice plate has two or more grooves at a center-to-center spacing of 0.098 inch and a groove depth of 0.067 inch. Four grooves are illustrated. A 0.050-inch diameter fluid duct is located off-center in each groove. These have axes perpendicular to the face of the orifice plate along a straight line on 0.098-inch centers. Width W of the grooved portion, as viewed in FIGURE 20, is about 0.2 inch; it should be noted that the axes of the fluid ducts 53, 53a are located a distance of about W/2 from the edge of the orifice plates 52, 52a. The apparatus is assembled as shown in FIGURE 5 with the grooves in approximate alignment and with a separation distance X between the halves of 0.094 to 0.250 inch, preferably about 0.12 inch.

The cross-sectional shape of the grooves in the orifice plate may have any of several forms. Other wave or tooth forms than the gear-teeth shown may be used, including curvilinear sinusoidal corrugations or geometrical sawtooth shape. The grooves may have curved walls with a parabolic or semicircular shape or flat planes to form a triangular, trapezoidal or other rectilinear cross-section. A jet device having the above dimensions and the configuration of FIGURE 4 is particularly effective for splicing tow.

Figure 21:
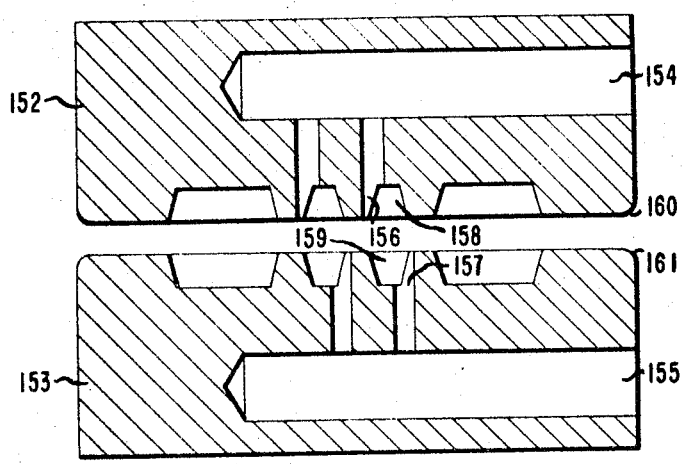
FIGURE 21 is a sectional view, similar to that of FIGURE 5, of another form of apparatus for accomplishing the invention.
Figure 22:
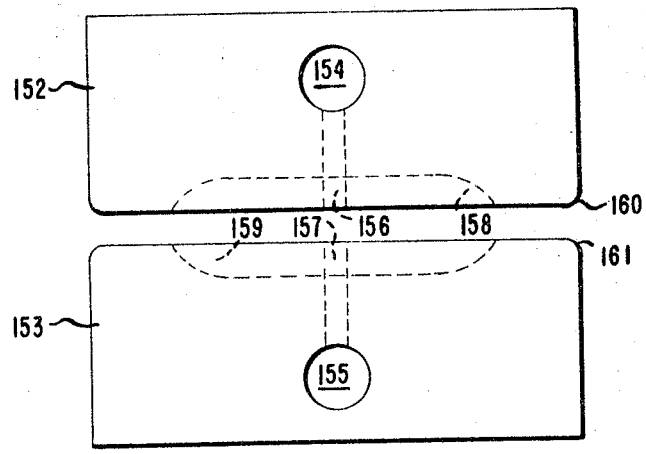
FIGURE 22 is a side elevation of the apparatus shown in FIGURE 21.

FIGURE 21 is a sectional view of a form of the apparatus similar to FIGURE 5. FIGURE 22 is a side elevation of the apparatus shown in FIGURE 21. The assembly comprises two body members, having opposed planar faces, with suitable supporting structure. One half comprises a body 152 with grooves 158 formed in one face, a passage 154 for the introduction of the treating fluid and fluid ducts 156 to conduct the fluid from passage 154 to grooves 158 in a direction essentially perpendicular to the face of the body member. Similarly, the second half of the assembly is a body member 153 with a fluid supply passage 155, and fluid ducts 157 communicating with grooves 159 in the face of the body. The grooves 158 and 159 should be sufficiently long to permit ready lateral flow of the spent fluid away from the zone of fluid treatment between the ducts 156 and 157. As shown, the grooves extend about one-half the distance to the face edges. The edges of the body member are chamfered or rounded as at 160 and 161. The advantage of this embodiment is that there is no obstruction to the free passage of filamentary material through the space between the two body members. With the grooves fully recessed in the faces and the edges of the body members rounded, individual filaments or groups of filaments will pass freely through the apparatus during the treatment.

In other embodiments of the apparatus for splicing tow it is possible for the fluid jets to be directly aligned and opposed or to intercept the grooves at the center line of the transverse section. Two or more counteracting streams, either directly aligned or slightly offset, will produce the splice. An odd number of fluid streams will also operate, such as a single stream directed between and counteracting a pair of opposite streams.

Although a gaseous treating fluid is preferred, any of the embodiments of this invention can be operated with liquid as the fluid. For example, they will produce effective joints with water at about 80 p.s.i.g. One of the advantages of using air is that a dry joint is obtained.

As indicated by the above dimensions, the apparatus is particularly compact and may be fabricated from conventional materials such as metals, plastics, ceramics or other common materials of construction.

One of the products of this invention is a joint between two or more filamentary bundles comprising a distinct zone of interentanglement of the filaments of each bundle with the filaments of the adjoining bundle.

Figure 23:
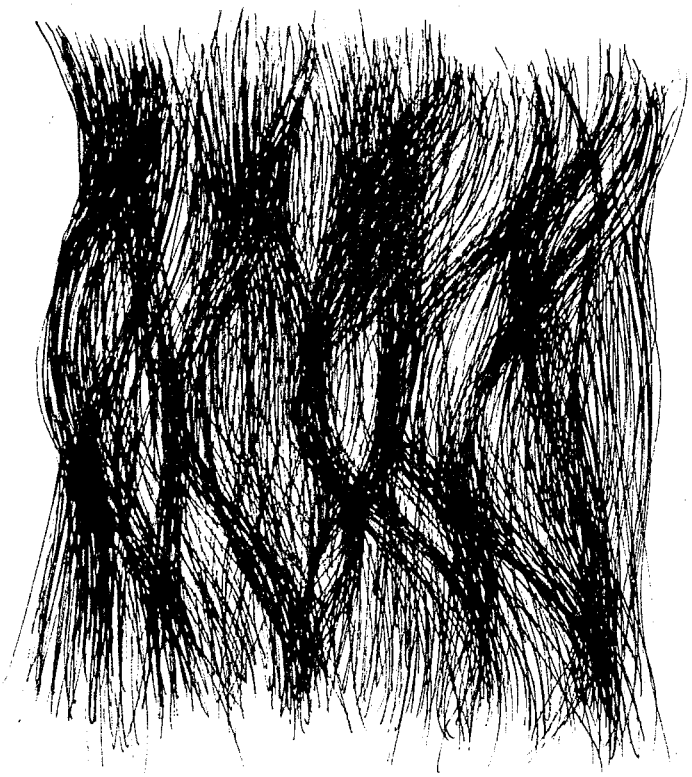
FIGURE 23 is a schematic top view of the area of a tow treated by the opposed jets and showing the tow splice having interlocked twisted bundles of filaments.

As illustrated in FIGURE 17, a linear zone, i.e., narrow swath of entangled filaments 114, between the ends 110 and 111, connects filament bundles 112 and 113 in an overlapping joint. FIGURE 23 shows the interlocked twisted bundles of filaments which are characteristic of the treated area of a spliced tow product produced in accordance with this invention. Joints produced in the apparatus of FIGURES 4, 5 and 20 have demonstrated substantial strength. Nylon tows of 2.3 d.p.f. and 618,000 total denier; 3 d.p.f., 430,000 total denier; and 18 d.p.f., 440,000 total denier, which have been joined by the process in a single pass of the tow using an air pressure of 90 p.s.i.g. in the apparatus of this invention, yield joints which withstand at least 200 pounds pull. A useful range of air pressures for this purpose is 25 to 500 p.s.i.g. In making tow joints as above, the relative velocity of the fiber strands with respect to the fluid streams is of the order of 5 to 20 inches per second. The relative velocity is governed by the fibrous material to be joined and the configuration of the apparatus. The material should pass through the fluid streams at a rate which will allow sufficient time for the streams to produce the desired entangling effect. This invention is not limited to nylon. Strong joints in polyester tows of 1½ d.p.f. fiber of 800,000 to 1,100,000 total denier and 3 d.p.f. fiber of 460,000 to 920,000 total denier have been made in the apparatus of FIGURES 22 and 6 using air at pressures in the range of 65–95 p.s.i.g. Any filamentary bundle of synthetic or natural fibers may be joined by this process. The process is not dependent on thermoplasticity, solubility, or other adhesive property of the fiber materials, and avoids the use of knots or cement. The fibers must have sufficient length to encompass the length of the joint. When continuous filament yarn is being joined, the absence of twist facilitates the joining process although a moderate degree of twist may be tolerated. After the joint has been made, free ends may be trimmed short with scissors or other cutting instrument, if desired. However, trimming is unnecessary, since the splicing treatment can extend to the tips of the filamentary bundles.

This invention may be utilized at any stage in textile fiber manufacture or use, wherever there is need for joining filamentary strands. This includes fiber spinning, stretching, relaxing, beaming, weaving, tow cutting, drying and the like. If desired, filamentary strands may be joined at any point along their respective lengths; use of this invention is not restricted to the joining of strands at the ends. For example, the free end of one yarn bundle may be incorporated into another yarn bundle at an intermediate region along its length in order to commence a plying operation without severing a continuous strand. It may also be desirable to join together adjacent filament bundles at predetermined regions along the lengths to provide coherency to the assembly of bundles at each region. The path of fluid treatment may traverse the strand either perpendicularly or diagonally with respect to the longitudinal axis of the filament bundles.

The following examples illustrate the application of the process of the present invention to the production of non-woven fabrics but are not intended to be limitative.

Tensile properties are measured on an Instron tester at 70° F. and 65% relative humidity. Strip tensile strength is determined for a sample 1-inch wide, using a 5-inch sample length between jaws of the tester and elongating at 100% per minute. Drape flex or bending length is determined by using a sample 1-inch wide and 6-inches long and moving it slowly in a direction parallel to its long dimension so that its end projects from the edge of a horizontal surface. The length of the overhang is measured when the tip of the sample is depressed under its own weight to the point where the line joining the tip to the edge of the platform makes an angle of 41.5° with the horizontal. One-half of this length is the bending length of the specimen, reported in centimeters. Thickness is measured with Ames thickness gauges. Tongue tear strength is measured in accordance with ASTM D–39 except that a sample 2.5 inches by 2 inches and having a 1.25-inch slit is used.

Example 1

This example illustrates the preparation of a non-woven fabric having adjacent patterned rows across the fabric using jet devices of the type shown in FIGURE 6.

The initial sheet is a web of continuous, polyethylene terephthalate filaments which are disposed substantially at random. Filament denier is 2.9 and web weight is about 3 oz./yd.² The filaments are capable of about 7.6% spontaneous elongation when heated in 100° C. water. Preparation of such spontaneously elongatable filaments is taught in Kitson et al. U.S. Patent No. 2,952,879 issued Sept. 20, 1960. Prior to treatment, the web is moistened lightly with a fine water spray to help hold the filaments in place.

Dimensions for each jet device are as follows:

Groove diameter _____inch__ 0.035
No. of grooves _____ 4
Groove length _____inch__ 0.125
Center-to-center distance between grooves__do____ 0.035
Gas exit-hole diameter_____do____ 0.020
Overall dimensions of jet device __inch__ 1 x 0.25 x 0.531

Two jet devices are arranged with their grooved faces 0.125 inch apart and with their grooves and holes arranged as described in connection with FIGURE 6. Starting at one edge of the web, and proceeding across it, adjacent patterned rows are inserted in the web at a frequency of 10 patterned rows per inch of fabric. Each row is made by passing the web once in the direction indicated by arrow 65 in FIGURE 6 and once in the direction indicated by arrow 66. The treatment as carried out with steam supplied at 80 p.s.i.g. pressure to the jet devices.

A second web is treated in the same way except that 13.5 patterned rows per inch are inserted.

The coherent patterned fabrics so obtained are then pressed between 30 mesh screens at 200° C. for 1 minute at 25 p.s.i. pressure. This develops the spontaneous elongation of the filaments, causing them to buckle on one another in the openings of the screen, thereby imparting bulk to the fabric. The resulting fabric is washed, ironed and tested. Physical properties of the fabric having 10 rows per inch are as follows:

|  | MD | Bias | XD |
| --- | --- | --- | --- |
| Weight (oz./yd.²) | 3.4 | 3.4 | 3.4 |
| Strip tensile strength (lb./in./oz./yd.²) | 5.4 | 7.3 | 10 |
| Elongation (percent) | 177 | 142 | 105 |
| Tongue tear strength (lb./oz./yd.²) | 4.3 | 3.8 | 3.8 |
| Bending length (cm.) | 2 | 2.1 | 2.3 |

Properties of the fabric having 13.5 rows per inch are as follows:

|  | MD | Bias | XD |
| --- | --- | --- | --- |
| Weight (oz./yd.²) | 3.1 | 3.1 | 3.1 |
| Strip tensile strength (lb./in./oz./yd.²) | 5.6 | 6.8 | 9.9 |
| Elongation (percent) | 174 | 139 | 111 |
| Tongue tear strength (lb./oz./yd.²) | 4.2 | 3.0 | 2.9 |
| Bending length (cm.) | 1.9 | 1.8 | 2.1 |

MD values are measured in the direction of the patterned rows; XD values are 90° thereto and bias values are 45° thereto.

Figure 10:
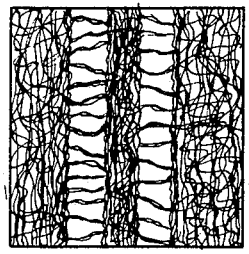
FIGURES 10 and 10a are schematic top views of products of the present invention.
Figure 10A:
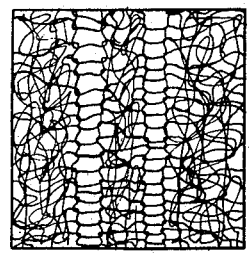
Figure 11:
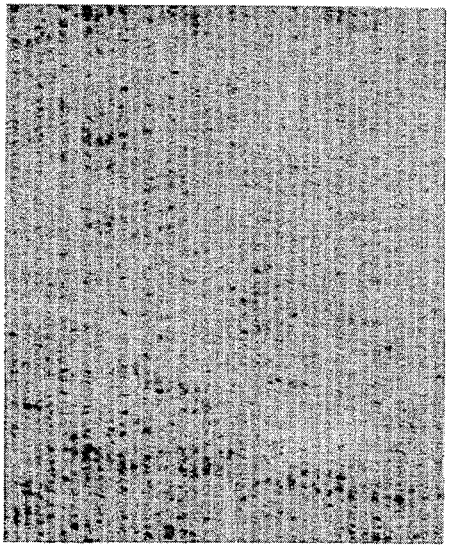

Although the arrangement of the jet devices is such that a knit stitch of the type indicated in FIGURE 10a could be produced, the fact that the web is passed once in direction 65 and then once in direction 66 (FIGURE 6) leads to production of a patterned row of the type shown schematically in FIGURE 10. The fabric is soft, strong and drapable and is shown at about 1× in FIGURE 11. Because of the ladder-like arrangement of the patterned rows, the fabric has a desirable fabric-like stretch in the bias direction.

Example 2

The procedure of Example 1 is repeated to impart 10 patterned rows per inch across an initial sheet. The patterned sheet is then turned 90° with respect to its original direction of passage and passed between the jet devices to insert 10 patterned rows per inch at right angles to the original rows. The fabric obtained in this manner has fibers arranged in a pattern resembling an open-mesh woven fabric.

Example 3

This example illustrates the joining of several layers of fibers to produce a nonwoven fabric.

The initial sheet is a web of randomly disposed, continuous, white, polyethylene terephthalate filaments of 3 denier per filament on which a very light layer of generally parallel filaments is laid. The latter filaments are of the same type as those in the first mentioned web but are black.

Figure 12:
Figure 13:
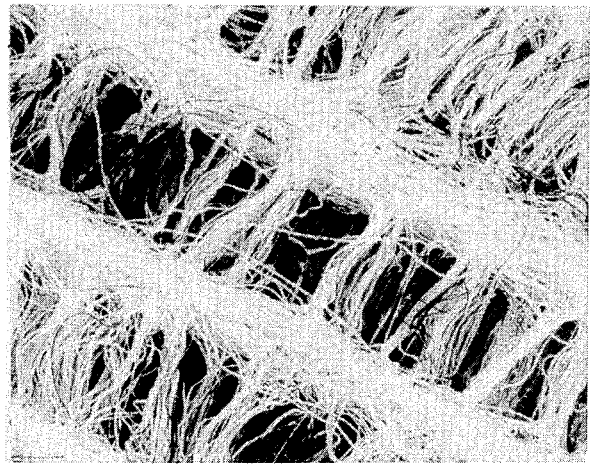

Jet devices having the same dimensions as those listed in Example 1 are used but the pair of jet devices are arranged as shown in FIGURE 4. Superheated steam at 80–100 p.s.i.g. is supplied to the jet devices. The assembly is passed between the opposed jets so that the generally parallel, black fibers are in the direction 90° to the direction of passage through the treating device. Treatment is repeated across the assembly to insert 10 patterned rows per inch across the fabric. A strong coherent fabric is produced in which both layers of fiber are integrated into a unitary structure. The two faces of the fabric are shown in plan view at about 15× magnification in FIGURES 12 and 13. The penetration of fibers from one face of the fabric to the other is evident in these figures.

Example 4

This example illustrates the preparation of a patterned nonwoven fabric using air as the gas.

The initial sheet is a 2.5 oz./yd.$^2$ web of randomly disposed, polyester, continuous filaments of 3 denier per filament.

The jet devices used are of the type and arrangement shown in FIGURE 5. Overall dimensions of each jet device are 1 x 0.25 x 0.625 inch. Groove length is 0.125 inch and there are four grooves, each having a gas exit-hole 0.024 inch in diameter drilled off-center therein perpendicular to the face of the jet device. Center-to-center spacing of the grooves is 0.065 inch. Air is 80 p.s.i.g. pressure and heated to 110° C. is supplied to the jet devices. The sheet is treated to impart 10 patterned rows per inch. A strong, coherent fabric of the type shown schematically in FIGURE 10 is obtained. Its properties are given below:

|  | MD | XD |
| --- | --- | --- |
| Strip tensile strength (lb./in./oz./yd.$^2$) | 3.1 | 2.5 |
| Elongation (percent) | 130 | 150 |
| Tongue tear strength (lb./oz./yd.$^2$) | 1.8 | 1.6 |

Example 5

This example illustrates the preparation of a nonwoven fabric from staple fibers.

The initial sheet is a batt of randomly disposed, 3 denier per filament, polyethylene terephthalate, staple fibers having a length of about 1 inch (2.54 cm.).

The jet device apparatus described in Example 3 is used but it is supplied with air at 35–40 p.s.i.g. pressure instead of steam. The sheet is processed to introduce patterned rows adjacent one another across the sheet. The fabric obtained is of the type shown schematically in FIGURE 10.

Example 6

Figure 1:
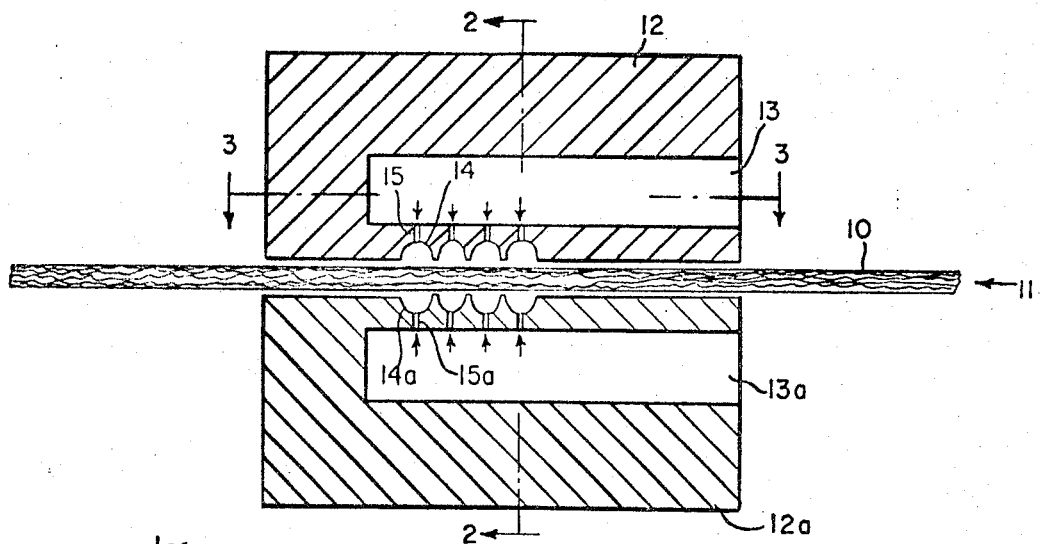
FIGURE 1 is a sectional side view taken along line 1—1 of FIGURE 2, showing one form of jet device and the positioning of a sheet of material being treated.
Figure 2:
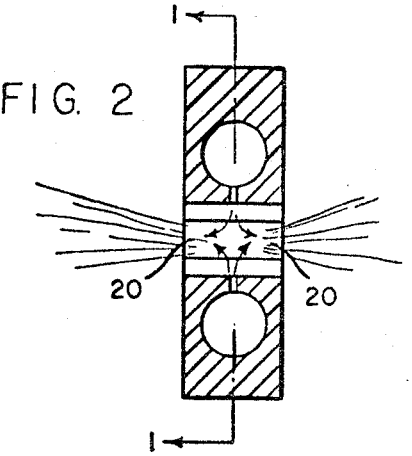
FIGURE 2 is a sectional view taken along line 2—2 of FIGURE 1.

This example illustrates preparation of a non-woven fabric using jet devices of the type shown in FIGURE 1.

The jet devices have 4 grooves with a 0.024-inch gas exit-hole drilled in each groove perpendicular to the jet face on the center line of the groove. Groove diameter is 0.063 inch and groove length is 0.25 inch. Center-to-center distance between grooves is 0.063 inch. Overall dimensions of each jet device are 1.5 x 0.25 x 0.5 inch. Using the jet apparatus shown in FIGURE 1, supplied with 90 p.s.i.g. air, a sheet of randomly-disposed continuous filaments is treated to insert patterned rows across the sheet at about 0.3 inch intervals. The resulting nonwoven fabric is strong and coherent and is patterned as shown schematically in FIGURE 10.

Example 7

This example illustrates operation of the process to insert a knit-like stitch in a sheet.

The initial sheet is a web of randomly disposed, polyester, continuous filaments of 3 denier per filament.

Figure 14:
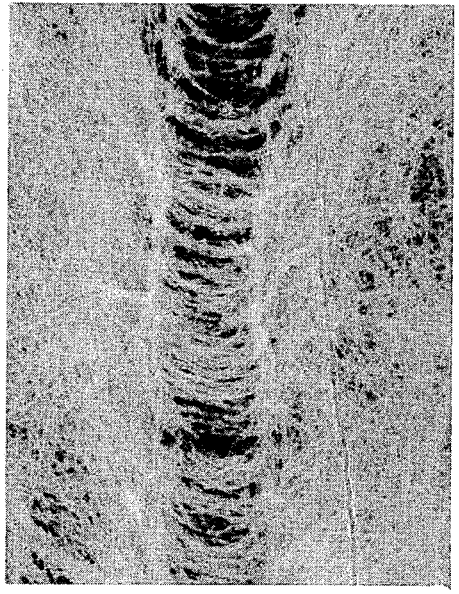
FIGURES 11–14 are face view photographs of products obtained as described in Examples 1, 3 and 7.

Each jet device is of the type shown in FIGURE 5, having four grooves at a center-to-center spacing of 0.065 inch, each groove being 0.125 inch in length and having a gas exit-hole 0.024 inch in diameter drilled off-center therein perpendicular to the face of the jet device. The arrangement of the pair of jet devices differs from that shown in FIGURE 5 in that the gas exit-holes are off-center on the same sides of the grooves so that the gas exit-holes of the pair of devices are aligned approximately opposite to each other as shown in FIGURE 6. Using air at 92 p.s.i.g. pressure, the sheet is passed once between the jet elements in the direction indicated by arrow 65 of FIGURE 6, i.e., opposed to the swept back outflow of gas from the jets discussed previously. The patterned row obtained in the sheet in this fashion exhibits a characteristic, successive looping of fibers along the path of the jet, producing a knit stitch of the type indicated schematically in FIGURE 10a. The structure is shown in more detail in FIGURE 14, a photomicrograph at 6× magnification.

Example 8

This example illustrates preparation of bulky nonwoven fabrics suitable for use as batting for sleeping bags, quilts and the like.

A 2-oz./yd.$^2$ web of 13 denier per filament, spontaneously elongatable, fibers is treated as described in Example 1 to insert patterned row 0.5 inch apart. These patterned rows firmly entangle the fibers of the sheet together along parallel stitch-like lines 0.5 inch apart. The sheet is then heated to develop the spontaneous elongation of the fibers by placing the sheet in a press between platens heated to 200° C. No pressure is placed on the sheet which would restrain development of bulk. This treatment causes bulking of the sheet in the area between patterned rows. The resulting product is stable and possesses good bulk and resilience.

Example 9

This example illustrates preparation of a patterned nonwoven fabric using a liquid as the treating fluid.

The initial sheet is a 3 oz./yd.$^2$ web of randomly disposed, polyester, continuous filaments of 3 denier per filament.

Jet devices having the dimensions described in Example 1 are used and are positioned with their grooves and holes arranged as described in connection with FIGURE 4. Starting at one edge of the web portion and proceeding across it, adjacent patterned rows are inserted in the web at a frequency of 10 patterned rows per inch of fabric. The treatment is carried out using water at 65 p.s.i.g. The patterning is of the type shown in FIGURE 10.

Similar products are also made using the jet devices and arrangement described in Example 4, and using water at 65 p.s.i.g. and 95 p.s.i.g.

In the jet devices of the present invention, each pair of upper and lower grooves and associated fluid exit holes produces a separate zone of patterning flow, which zone approximately corresponds to the length of the groove.

Multiple zones on coalignment cooperate to produce the novel patterning in the sheet being treated. When the relative motion between the sheet and jet devices is parallel to the above mentioned coalignment, a maximum patterning effect is produced. When the motion is at a small angle to the coalignment, a pattern is produced as long as the paths of the successive zones of patterning flow overlap by at least about 50%. By operating within this limitation and altering the direction of relative motion between the sheet and the jet devices to follow a curved path, curved patterned rows and even closed loops have been produced in a sheet. However, for forming curved patterns of a given radius of curvature, a preferred device has its fluid exit holes and associated grooves coaligned along a line corresponding to the given radius of curvature.

When the process of the present invention is used for joining tow or other filament bundles, such as yarn, the jet devices should provide one or more sets of opposed streams of fluid, and the material should preferably be treated in the direction generally perpendicular to the alignment of the filaments.

Since many different embodiments of the invention may be made without departing from the spirit and scope thereof, it is understood that this invention is not limited to the specific illustrations disclosed.

We claim:

1. Apparatus for entangling fibers in an assembly of fibers, which comprises a pair of spaced orifice plates having opposed faces which are generally parallel to define a treating zone open at the sides for passage of a fiber assembly through the treating zone, orifices in said plates for directing high velocity streams of fluid into the treating zone, the orifices being aligned in a common plane to form opposed streams, grooves in said faces aligned perpendicular to said common plane for directing fluid outflow from the treating zone along transverse paths, and means for supplying fluid to said orifices.

2. Apparatus for joining portions of a plurality of multifilament strands which comprises opposed orifice plates spaced for treating a plurality of filamentary strands therebetween, the plates having opposed faces which are generally parallel to define a treating zone open at all sides for passage of said strands laterally through the treating zone, orifices in each of said plates for directing high velocity streams of gaseous fluid into the treating zone, said orifices being arranged in a common plane which is essentially perpendicular to said opposed faces, the orifices being aligned in said plane to form opposed pairs of streams, diverting grooves in each of said faces which are aligned perpendicular to said common orifice plane with an orifice off-center in each groove, each of the grooves having inclined faces for diverting the opposed stream toward the orifice in the groove, and means for supplying gaseous fluid to said orifices.

3. Apparatus as defined in claim 2 wherein the orifices are aligned to form directly opposed pairs of streams.

4. Apparatus as defined in claim 2 wherein the orifices are aligned to form opposed pairs of streams which flow closely adjacent to each other in opposite directions.

5. Apparatus for joining portions of a plurality of multifilament strands which comprises two body members arranged with adjacent faces spaced to accommodate said strands, said faces being generally parallel, parallel grooves in each of said faces, orifices off-center in said grooves for directing streams of gaseous fluid into the grooves in the opposite face, and fluid passages in each body member for supplying fluid to the orifices.

6. Apparatus as defined in claim 5 wherein there are at least two of said grooves in each of said parallel adjacent faces.

7. Apparatus as defined in claim 5 wherein said grooves provide the configuration of gear teeth.

8. Apparatus as defined in claim 5 wherein said orifices are in a common plane which is perpendicular to said parallel adjacent faces.

9. Apparatus for joining portions of a plurality of multifilament strands which comprises two body members having opposed planar faces spaced to accommodate said strands, said faces being generally parallel and having rounded edges, a pair of centrally located orifices in each body member for directing streams of gaseous fluid against the opposed face of the other body member, said orifices being arranged in a common plane which is essentially perpendicular to said body faces, the orifices being aligned in said plane to form opposed pairs of streams which are slightly offset relative to each other, a pair of grooves recessed in each of said body faces aligned perpendicular to said common orifice plane with an orifice off-center in each groove, each groove being aligned with a groove in the opposed face and extending across the body face about one-half the distance to the face edges to discharge fluid sideways from the orifices, and fluid passages in each body member for supplying fluid to the orifices.

10. Apparatus for treating loose fibrous sheets to form patterned nonwoven fabrics which comprises, a pair of opposed jet devices defining therebetween a treatment zone which is open around the sides for passage of the sheet material, opposed face portions on the devices which are generally parallel for maintaining the sheet flat during passage through the treatment zone, a series of small holes in each device substantially perpendicular to said face portions for discharging high velocity fluid streams against opposite faces of the sheet, said series of holes being coaligned in the direction of sheet passage to form a patterned row, an internal plenum in each device for supplying fluid to said holes, and grooves extending transversely across the line of holes in each device for directing fluid outflow from the treating zone along transverse paths against the sheet.

11. Apparatus as defined in claim 10 wherein the grooves in each jet device are in the face adjacent to the sheet and each device has a single one of said fluid discharge holes in each groove.

12. Apparatus as defined in claim 11 wherein the grooves in the jet devices are aligned parallel to each other with the discharge holes coaligned to discharge opposed streams of fluid against opposite faces of sheet material during treatment.

13. Apparatus as defined in claim 11 wherein the holes are centered in the grooves and are directly opposed.

14. Apparatus as defined in claim 11 wherein the holes are off-center in the grooves and are directly opposed.

15. Apparatus as defined in claim 11 wherein the holes in one jet device are off-center on one side of the grooves and the holes in the other jet device are off-center on the other side of the grooves.

16. Apparatus as defined in claim 10 wherein a plurality of pairs of opposed jet devices are combined in one apparatus to form a number of patterned rows in the sheet simultaneously.

References Cited

UNITED STATES PATENTS

| | | | |
|---|---|---|---|
| 3,214,819 | 11/1965 | Guerin | 28—72.2 |
| 3,237,269 | 3/1966 | Hawkins | 28—1 |
| 3,273,330 | 9/1966 | Gonsalves | 57—22 XR |
| 3,306,020 | 2/1967 | Rosenstein | 57—22 |
| 3,333,313 | 8/1967 | Gilmore et al. | 28—1 |
| 3,380,135 | 4/1968 | Wood et al. | 57—22 XR |

FOREIGN PATENTS

| | | |
|---|---|---|
| 921,229 | 3/1963 | Great Britain. |
| 956,992 | 4/1964 | Great Britain. |

ROBERT R. MACKEY, Primary Examiner

U.S. Cl. X.R.

28—1, 4; 57—22